United States Patent
Kubo et al.

(10) Patent No.: US 6,567,353 B1
(45) Date of Patent: May 20, 2003

(54) OPTICAL HEAD WITH LIGHT RECEIVING ELEMENT SURFACES DIVIDED INTO AT LEAST THREE LIGHT RECEIVING AREAS

(75) Inventors: Wataru Kubo, Saitama-ken (JP); Hiroshi Nishikawa, Saitama-ken (JP); Masato Noguchi, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/487,609

(22) Filed: Jan. 19, 2000

(30) Foreign Application Priority Data

Jan. 21, 1999 (JP) .......................... 11-012620
Jan. 21, 1999 (JP) .......................... 11-012621

(51) Int. Cl.⁷ .......................... G11B 7/135; G11B 7/095
(52) U.S. Cl. .............. 369/44.23; 369/44.36; 369/112.15; 369/44.41
(58) Field of Search .............. 369/112.17, 112.21, 369/44.41, 44.23, 112.15, 44.29, 44.36

(56) References Cited

U.S. PATENT DOCUMENTS

| | | | |
|---|---|---|---|
| 3,909,608 A | * 9/1975 | Le Merer et al. | 250/202 |
| 4,023,033 A | * 5/1977 | Bricot et al. | 250/201 |
| 5,278,401 A | 1/1994 | Takishima et al. | |
| 5,281,802 A | * 1/1994 | Kitabayashi | 250/201.5 |
| 5,293,372 A | * 3/1994 | Hoshino et al. | 369/116 |
| 5,297,114 A | 3/1994 | Itoh et al. | |
| 5,337,300 A | 8/1994 | Takishima et al. | |
| 5,434,835 A | 7/1995 | Konno et al. | |
| 5,479,387 A | * 12/1995 | Ando et al. | 369/44.23 |
| 5,684,762 A | 11/1997 | Kubo | |
| 5,751,674 A | * 5/1998 | Bradshaw et al. | 369/44.35 |
| 5,768,036 A | 6/1998 | Nakagishi et al. | |
| 5,850,380 A | 12/1998 | Kubo | |

FOREIGN PATENT DOCUMENTS

| | | |
|---|---|---|
| JP | 7-326084 | 12/1995 |
| JP | 8-45092 | 2/1996 |

* cited by examiner

*Primary Examiner*—W. R. Young
*Assistant Examiner*—Gautam R. Patel
(74) *Attorney, Agent, or Firm*—Greenblum & Bernstein, P.L.C.

(57) ABSTRACT

An optical head is provided with a beam splitting element which divides a beam reflected by a data recording surface of an optical disc into two beams with generating opposite defocus therebetween, and a pair of light receiving elements which receive the two beams divided by the beam splitting element, respectively, the pair of light receiving elements being arranged substantially on a same plane. A light receiving surface of each of the pair of light receiving elements is divided, by two lines extending in a direction corresponding to a tracking direction on the optical disc, into at least three light receiving areas. A focusing error signal is generated in accordance with outputs of the at least three light receiving areas.

13 Claims, 14 Drawing Sheets

OPTICAL HEAD WITH LIGHT RECEIVING ELEMENT SURFACES DIVIDED INTO AT LEAST THREE LIGHT RECEIVING AREAS

BACKGROUND OF THE INVENTION

The present invention relates to an optical head (i.e., a data recording/reproducing head) for an optical disc drive for recording, reproducing and/or erasing data on an optical disc.

Conventionally, data recording/reproducing devices for recording/reproducing data on an optical disc have been known. Among such devices, a device which divides a light beam reflected by the optical disc into a pair of beams, and generates a servo signal in accordance with the signals received by a pair of light receiving elements has been known. An example of such a device is disclosed in Japanese Patent Provisional Publication No. HEI 7-326084.

In the Publication, an optical head is constructed as follows. A reflected laser beam from an optical disc is divided into three beams using a Wollaston prism. One of the beams is used as a beam for generating a servo signal, and the other two beams are used as beams for generating a data signal. Further, using a hologram plate, the beam for generating the servo signal is divided into a pair of beams in a direction perpendicular to the direction where the Wollaston prism divides the beam, and causes the divided beams to defocus, with respect to a predetermined focal plane, in positive and negative directions, respectively. The beams for generating the servo signal that emerge from the hologram plate are incident on a pair of photo sensors. In accordance with the outputs of the servo sensors, the servo signal is obtained.

In the above-descried optical head, each of the beams for generating the data signal is also divided into a pair of beams using the hologram plate in the direction where the Wollaston prism divides the beam. The divided beams are impinged onto two pairs of photo sensors, which are located next to the sensors for the servo signal. Then, based on the output of the sensors for obtaining the data, data signal (which will be referred to as an MO signal) is obtained.

FIG. 16 shows a configuration of sensors 50, 51, 50' and 51' and a signal processing unit 52 for a conventional optical head. FIG. 17 is an enlarged view of one of the sensors 50, 51, 50' and 51'. The laser beam reflected by an optical disc is divided into six beams as described above in a direction corresponding to a tracking direction on the optical disc (indicated by arrow T). It should be noted that, when a beam spot moves on the optical disc in the tracking direction, the reflected beam moves in the direction T with respect to the sensors 50, 51, 50' and 51'. In FIG. 16, the sensors for obtaining the servo signal (which will be referred to as servo sensors) are the sensors 51 and 51' which are located between the sensors 50 and 50' for generating the data signal (which will be referred to as data sensors). As shown in FIGS. 16 and 17, a light receiving surface of each of the servo sensors 51 and 51' are divided into three sectional light receiving surfaces 51a–51c, and 51'a–51'c, respectively.

The signal processing unit 52 includes adders 53–59 and subtractors 60–62. The adders 53–59 and the sensors 50, 51, 50' and 51' are connected as shown in FIG. 16, and the subtractors 60–62 and the adder 59 are connected to the adders 53–58 as shown in FIG. 16. The subtractor 60 outputs a focusing error signal (FES), the subtractor 61 outputs a tracking error signal (TES), the subtractor 62 outputs the MO signal (i.e., the data signal), and the adder 59 outputs a pre-format signal (i.e., an RO signal).

According to the conventional optical head as described above, the FES and the TES may not be affected by polarized condition of the laser beam reflected by the optical disc. Further, according to the above configuration, the number of the elements and/or portions to be adjusted is relatively small, and therefore adjustment of positions thereof can be done relatively easily.

In the above-described type of the optical head, when a beam spot traverses the tracks on the optical disc, a balance of the polarization components may change. In such a case, even if an objective lens of the optical head is in an in-focus condition with respect to a data recording surface of the optical disc, the focusing error signal may be generated, i.e., the FES is generated due to a T/F (tracking-to-focusing) cross-talk.

In the conventional optical head, adjustment has been made so that the T/F cross-talk becomes the lowest when the data recording tracks of the optical disc are formed at a predetermined pitch.

Recently, because of requirements for upsizing of capacity of the optical discs, a disc which may have a smaller track pitch may be used. In general, for a certain optical head, a wavelength of the laser beam, a numerical aperture (NA) of an objective lens, and an effective diameter of the objective lens are fixed. If the shape and/or pitch of grooves of the tracks of the optical disc are different from those which the optical head is originally designed for, a diffraction angle of the diffracted beam which is reflected by the optical disc may vary. Therefore, the quantity and/or intensity distribution of the diffraction components of the beams received by the sensors may vary.

A diffraction angle θ of an m-th diffraction component of a laser beam whose wavelength is λ is expressed as follows.

$$\sin \theta = \pm m \cdot \lambda / Tp$$

where, Tp represents a track pitch of an optical disc.

Therefore, the amplitude and a sensitivity of the tracking error signal (TES) and the focusing error signal (FES) generated by the sensors are affected by the variation of the track pitch Tp. Further, the T/F cross-talk is also affected by the variation of the track pitch Tp.

In the conventional optical head described above, each of the light receiving surfaces of the servo sensors 51 and 51' is divided into three sections by lines extending in a direction perpendicular to the T direction in FIG. 16. Therefore, when a disc is replaced with another disc having a different track pitch, the T/F cross-talk may not be cancelled sufficiently. In practice, however, the T/F cross-talk should be sufficiently suppressed regardless of the track pitch of the optical disc.

If a performance of an optical head is adjusted for an optical disc whose track pitch is relatively small, and if the optical head is used for an optical disc having a greater track pitch, the servo signal may become unstable, which prevents a quick seek operation.

SUMMARY OF THE INVENTION

It is therefore an object of the present invention to provide an improved optical head which is capable of generating a stable servo signal, and suppressing the T/F cross-talk sufficiently regardless of the track pitch of an optical disc.

For the above object, according to the present invention, there is provided an optical head which is provided with:

a beam splitting element which divides a beam reflected by a data recording surface of an optical disc into two beams with generating opposite defocus therebetween; and a pair of light receiving elements which receive the two beams divided by the beam splitting element, respectively, the pair of light receiving elements being arranged substantially on a same plane. A light receiving surface of each of the pair of light receiving elements is divided, by two lines extending in a direction corresponding to a tracking direction on the optical disc, into at least three light receiving areas. A focusing error signal is generated in accordance with outputs of the at least three light receiving areas.

Since the focusing error signal is generated based on the outputs of the light receiving areas which are arranged in a direction perpendicular to a direction corresponding to the tracking direction, variation of the track pitch of the optical disc may affect little in generating the focusing error signal.

According to another aspect of the invention, there is provided an optical head which is provided with: a beam splitting element which divides a beam reflected by a data recording surface of an optical disc into two beams with generating opposite defocus therebetween; and a pair of light receiving elements which receive the two beams divided by the beam splitting element, respectively, the pair of light receiving elements being arranged substantially on a same plane. A light receiving surface of each of the pair of light receiving elements is divided, by at least two lines extending in a direction corresponding to a tracking direction on the optical disc, into at least three light receiving areas. Further, the light receiving surface of each of the pair of light receiving elements is divided, by another line extending in a direction that is perpendicular to a direction corresponding to a tracking direction on the optical disc, into two light receiving areas. With this configuration, a focusing error signal and a tracking error signal are generated in accordance with outputs of the at least six light receiving areas, respectively.

Also with this configuration, variation of the track pitch of the optical disc may affect little in generating the focusing error signal.

Optionally, the focusing error signal is generated in accordance with a spot size method, and the tracking error signal is generated in accordance with a push-pull method.

Further optionally, the beam splitting element may include a hologram element.

In particular, the pair of beams divided by the beam splitting element are ±1st order diffraction beams diffracted by the hologram element, wherein a distance $\Delta L$ satisfies condition (1):

$$\alpha \leq \Delta L \leq 3\alpha \quad (1)$$

where, $\alpha$ is expressed by equation (2):

$$\alpha = 2 \cdot \lfloor 4 \cdot (NA_0)^2 \cdot \sigma + 3 \cdot (NA_1)^2 \cdot \Delta Z \rfloor + NA_1 \quad (2)$$

where, $NA_0$ is a numerical aperture of an objective lens of the optical head, $NA_1$ is a numerical aperture of a servo lens of the optical head, $\sigma$ is a deviation amount of a surface of the optical disc, and $\Delta Z$ a distance, along an optical axis of the optical head, between converging positions of the divided beams.

According to a further aspect of the invention, there is provided an optical head which is provided with: a beam splitting element which divides a beam reflected by a data recording surface of an optical disc into two beams with generating opposite defocus therebetween; a pair of light receiving elements which receive the two beams divided by the beam splitting element, respectively.

Optionally, the pair of light receiving elements may be arranged substantially on a same plane.

Further optionally, a light receiving surface of each of the pair of light receiving elements being divided, by two lines extending in a direction corresponding to a tracking direction on the optical disc, into at least three light receiving areas.

At least a focusing error signal and deviation of wavelength of the beam reflected by the data recording surface are detected based on outputs of the pair of light receiving elements.

Optionally, the light receiving surface of each of the pair of light receiving elements may be divided, by at least two lines extending in a direction corresponding to a tracking direction on the optical disc, into at least three light receiving areas.

Still optionally, the optical head may be provided with a compensation system which compensates the focusing error signal based on the deviation of the wavelength of the beam.

With this configuration, even if the wavelength changes and the distance between beam spots changes, the accurate focusing error signal can be obtained, and therefore accurate servo control can be realized.

In particular, the compensation system may include an amplifier whose gain is changeable in accordance with the deviation of the wavelength of the beam.

According to a further aspect of the invention, there is provided an optical head which is provided with: a beam splitting element which divides a beam reflected by a data recording surface of an optical disc into two beams with generating opposite defocus therebetween; and a pair of light receiving elements which receive the two beams divided by the beam splitting element, respectively. A light receiving surface of each of the pair of light receiving elements is divided, by two lines extending in a direction corresponding to a tracking direction on the optical disc and by another line extending in a direction that is perpendicular to a direction corresponding to a tracking direction on the optical disc, into six light receiving areas, and a focusing error signal and deviation of wavelength of the beam may be detected in accordance with outputs of the six light receiving areas.

Optionally, the pair of light receiving elements are arranged substantially on the same plane.

BRIEF DESCRIPTION OF THE ACCOMPANYING DRAWINGS

FIG. 1 a perspective view of a may part of an optical head for data recording/reproducing device according to a first embodiment of the invention;

Figure 10:
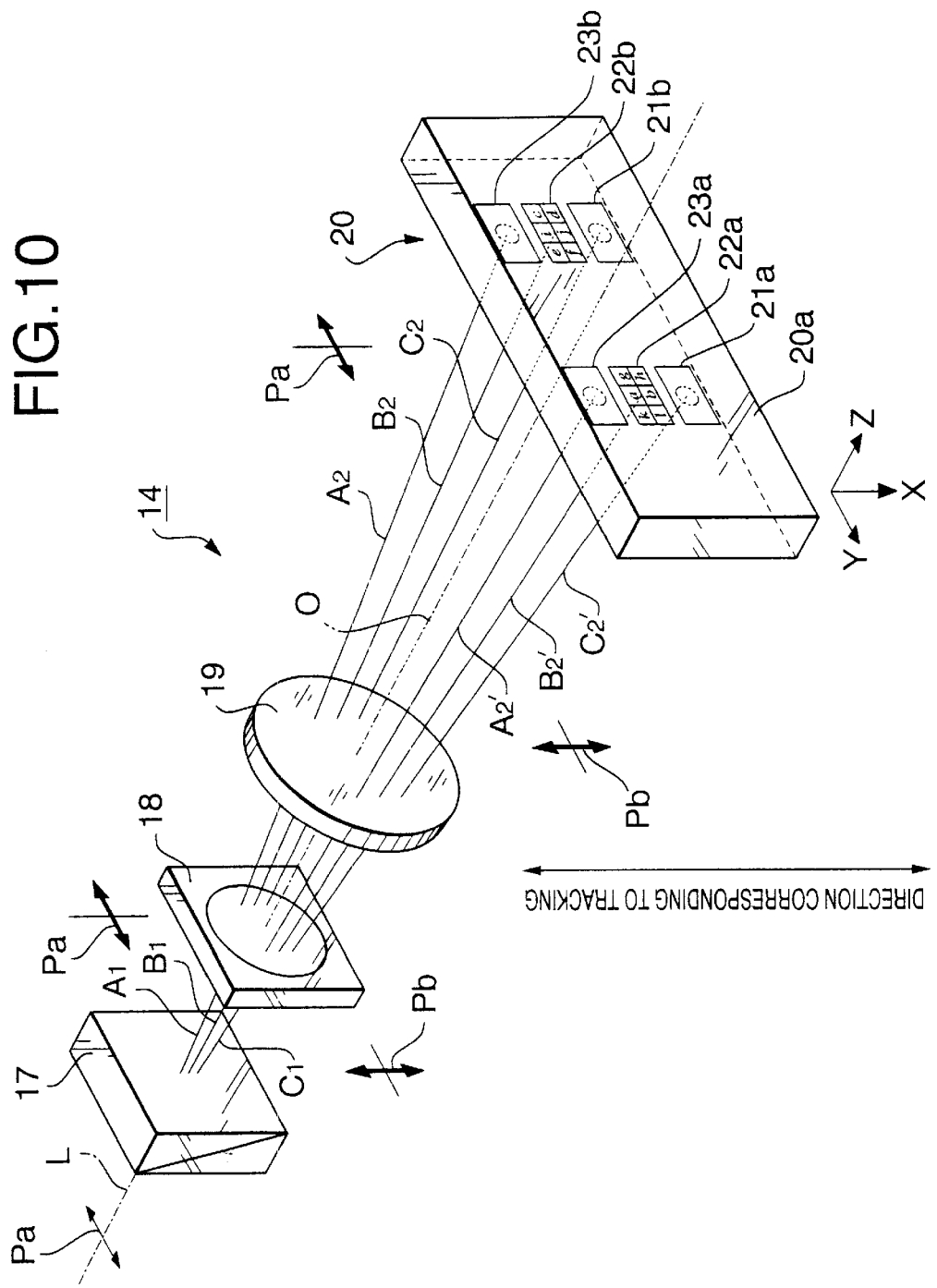
Figure 11:
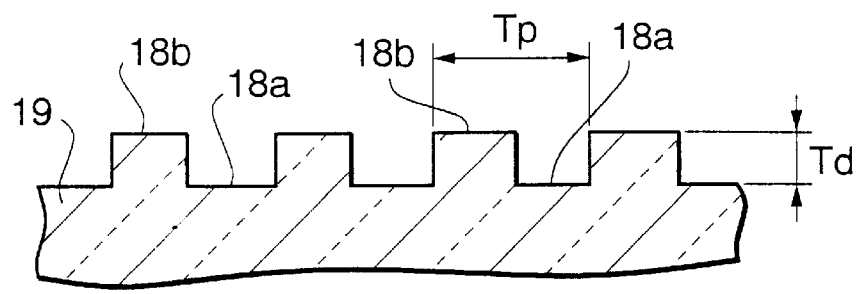
Figure 12:
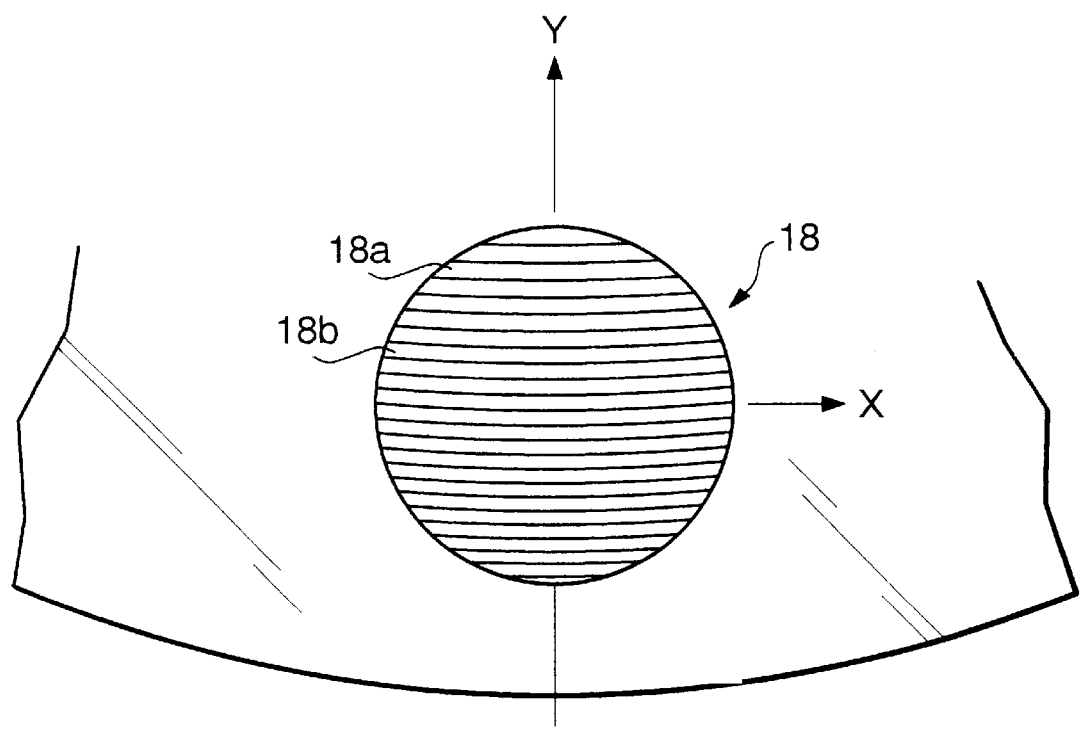
Figure 13:
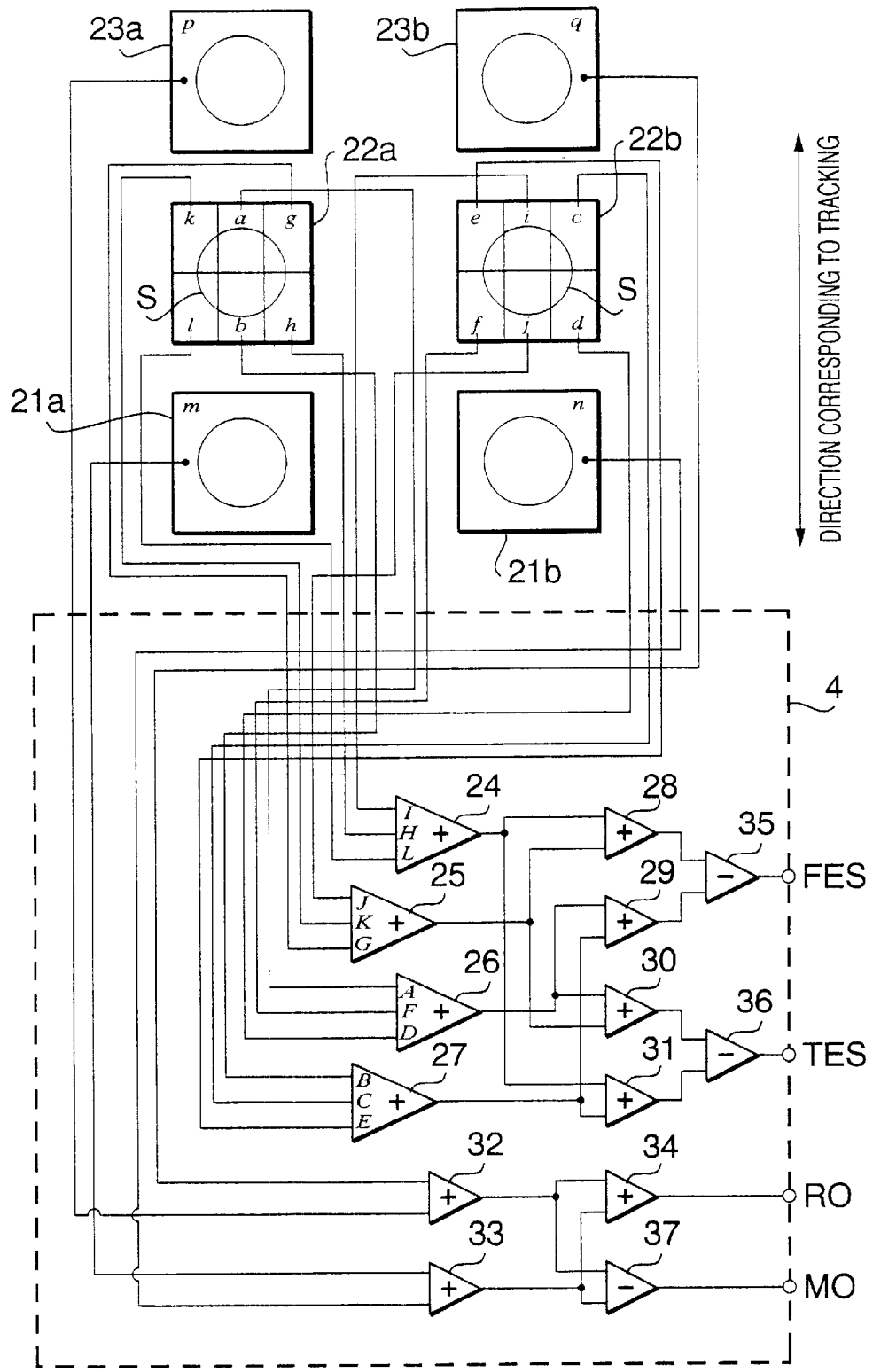
Figure 14:
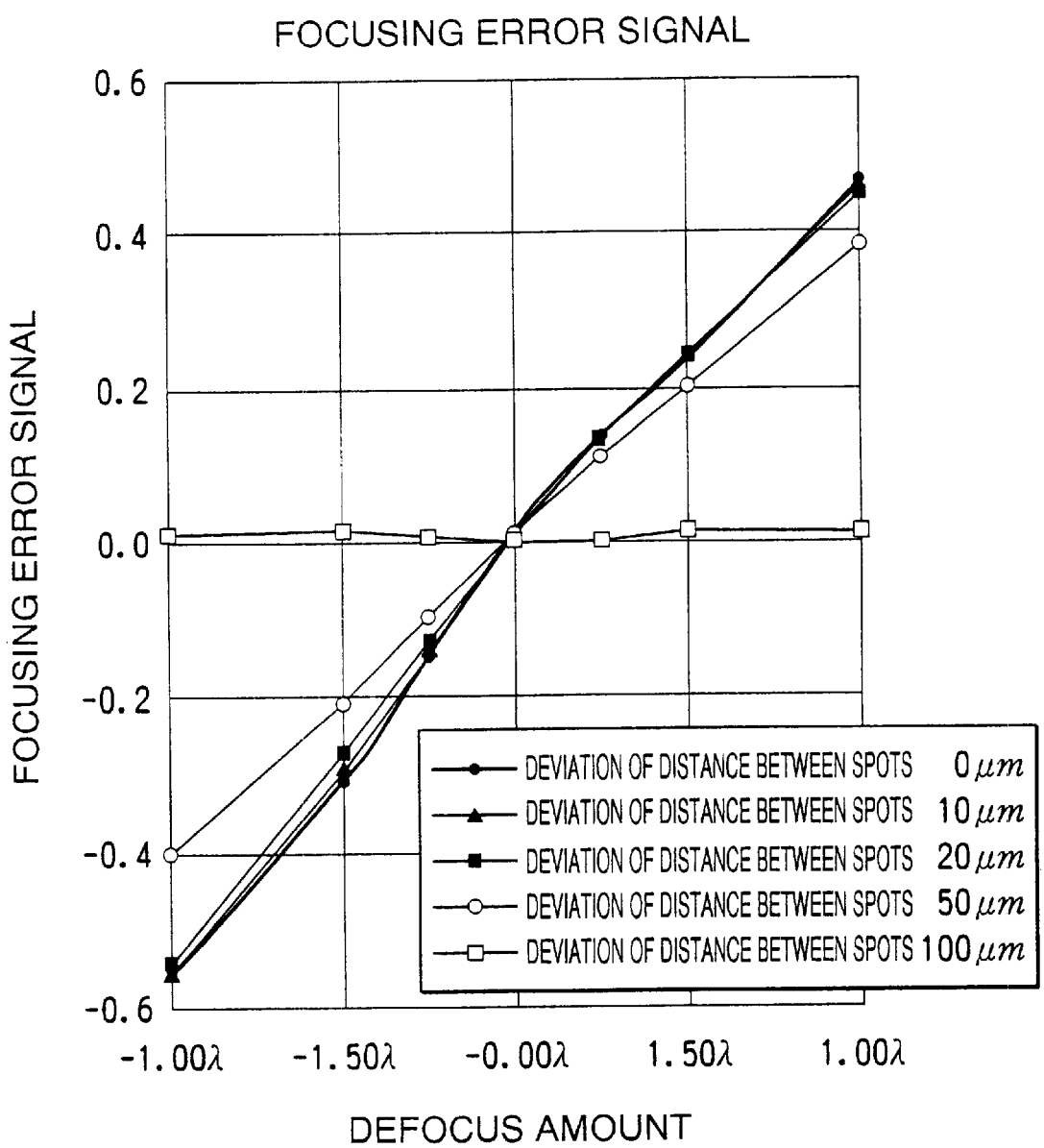
Figure 15:
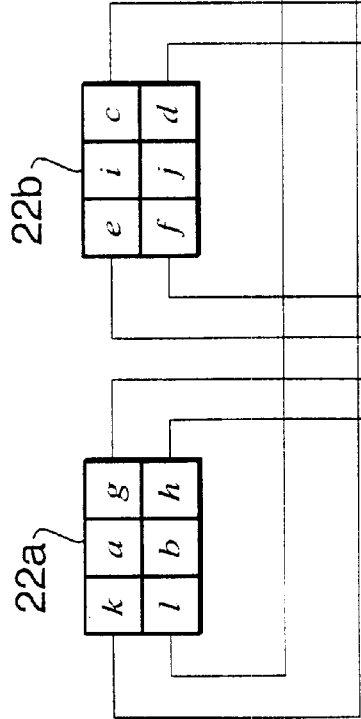
Figure 16:
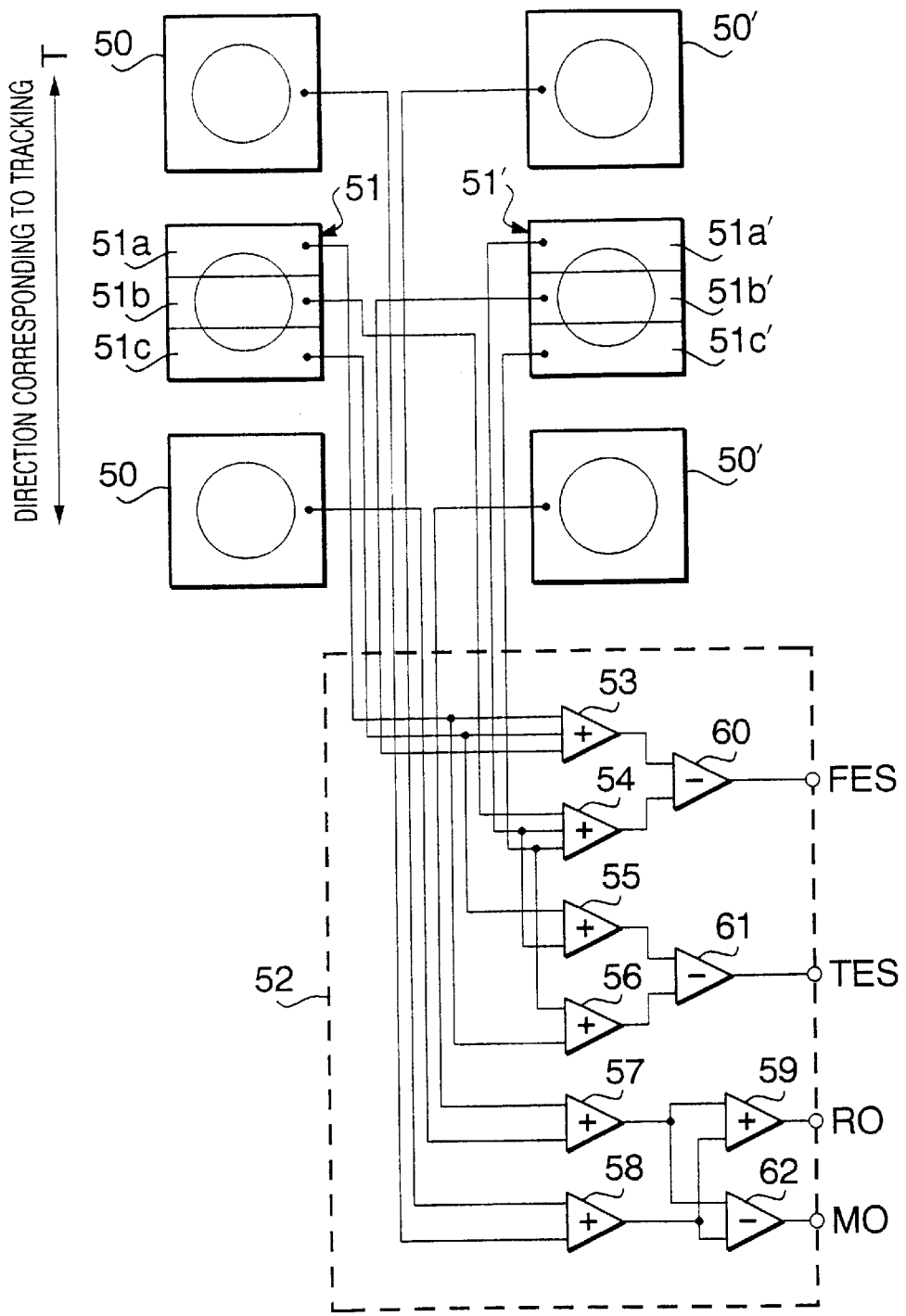
Figure 17:
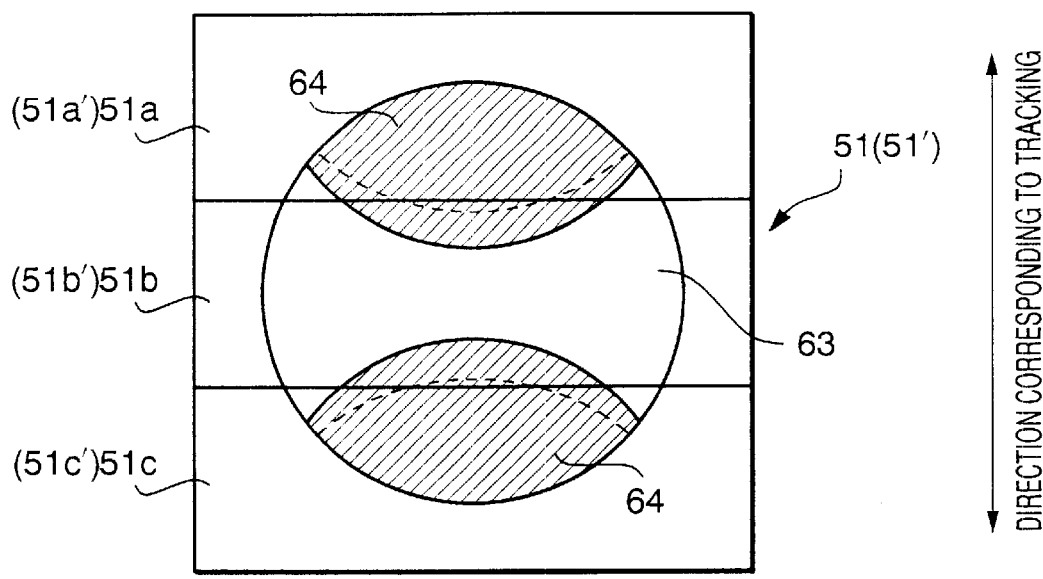

FIG. 10 a perspective view of a may part of an optical head for data recording/reproducing device according to a second embodiment of the invention;

FIG. 11 is a plan view of the hologram plate shown in FIG. 10;

FIG. 12 is a side view of a signal detection unit shown in FIG. 10;

FIG. 13 is a perspective view of an enlarged view of a signal detection unit of the optical head shown in FIG. 10;

FIG. 14 shows a connection between light receiving elements and a signal processing unit according to the second embodiment;

FIG. 15 is a graph showing a focusing error sensitivity;

FIG. 16 shows a connection between light receiving elements and a signal processing unit according to a conventional optical head; and FIG. 17 is a plan view illustrating a dividing direction of the servo sensors according to the conventional optical head.

DETAILED DESCRIPTION OF THE EMBODIMENTS

Figure 1:
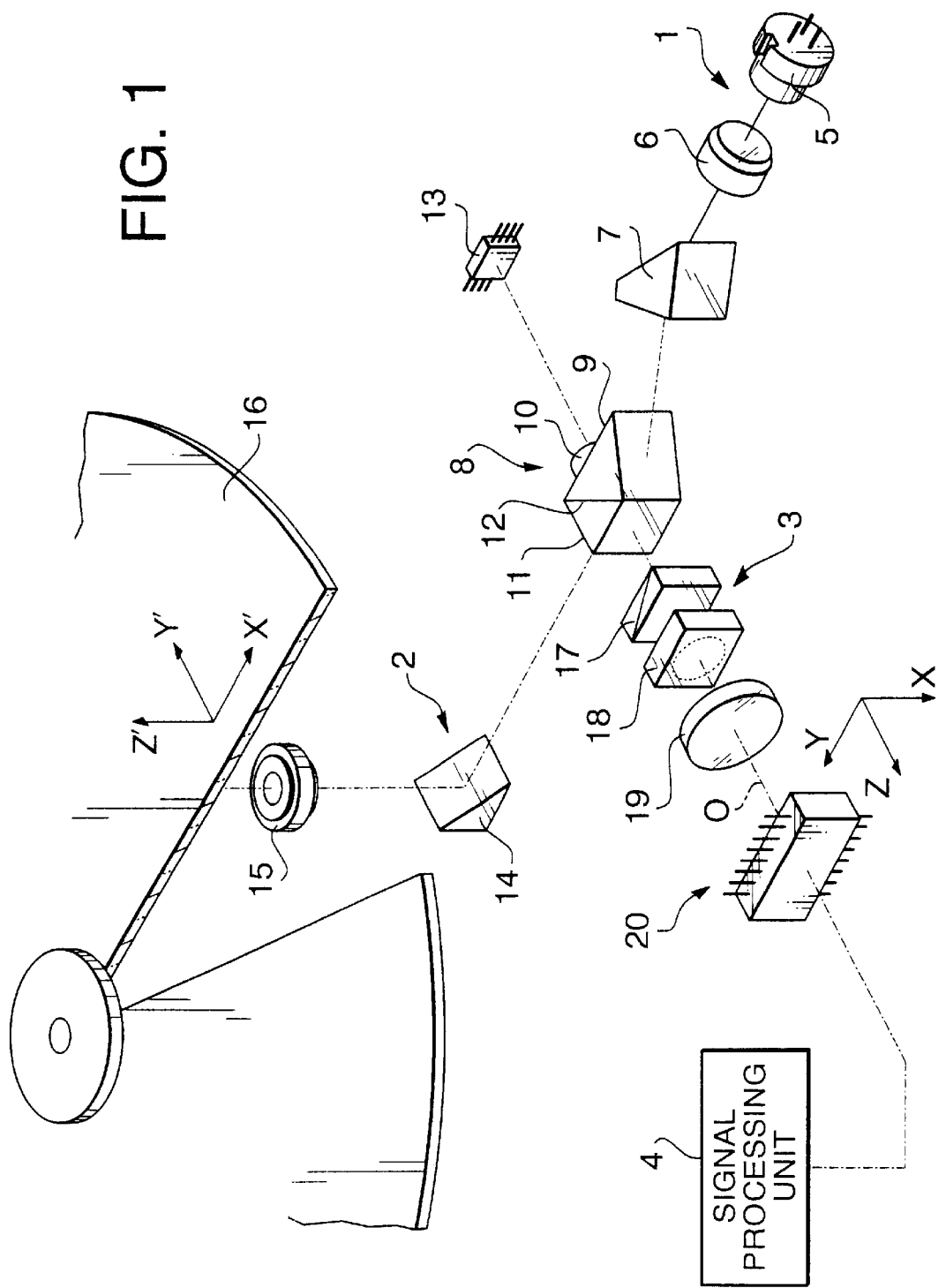

FIG. 1 is a perspective view of an optical head according to a first embodiment of the invention.

The optical head includes a light source 1, an objective optical system 2, a signal detection unit 3, and a signal processing unit 4.

The light source 1 includes a laser diode 5 for emitting a diverging laser beam, a collimating lens 6 which collimates the laser beam emitted by the laser diode 5, an anamorphic prism 7 which corrects a cross-sectional shape of the laser beam passed through the collimating lens 6. The laser beam passed through the anamorphic prism 7 is directed to a prism block 8.

The prism block 8 includes an anamorphic prism 9, a condenser lens 10, and a rectangular prism 11. The condenser lens 10 is cemented to the anamorphic prism 9. The anamorphic prism 9 further corrects the cross-sectional shape of the beam passed through the anamorphic prism 7 so that the beam has a circular cross section. A surface at which the anamorphic prism 9 and the rectangular prism 11 are cemented is formed to be a half mirror surface 12. The half mirror surface 12 reflects a part of the beam emitted from the light source 1 toward the condenser lens 10. The condenser lens 10 converges the incident beam on a light receiving element 13 for an APC (automatic power control). The power of the laser diode 5 is automatically controlled based on the output of the light receiving element 13.

The objective optical system 2 includes a mirror prism 14 and an objective lens 15. The beam passed through the half mirror surface 12 is reflected by the mirror prism 14 toward a magneto-optical disc 16 (in upward direction in FIG. 1), then converged on a data recording surface of the optical disc 16 by the objective lens 15.

On the magneto-optical disc 16, a plurality of data recording tracks, which are formed as concentric circles, are formed. The magneto-optical disc 16 is driven to revolve by a rotating device (not shown). In FIG. 1, an X'-Y'-Z' rectangular coordinate system is indicated to identify directions. The X' axis extends in a direction parallel to the tracking direction, the Y' axis extends in a direction perpendicular to the tracking direction (i.e., a tangential direction), and the Z' axis extends in a focusing direction (i.e., in a direction parallel to the optical axis of the objective lens 15).

The objective lens 15 is provided in a casing of the optical head (not shown), which is driven to move in the X' axis direction together with the mirror prism 14. The objective lens 15 is further driven to move in the direction of the optical axis by an actuator provided in the optical head to focus on the data recording surface of the magneto-optical disc 16.

The laser beam reflected by the magneto-optical disc 16 that passes through the objective lens 15 is reflected by the mirror prism 14 and is deflected to the prism block 8. The beam is then reflected by the half mirror surface 12 and is directed to the signal detection unit 3. An X-Y-Z rectangular coordinate system is also indicated in FIG. 1. The X, Y and Z axes at the signal detection unit 3 correspond to the X', Y', and Z' axes on the magneto-optical disc 16, respectively.

The signal detection unit 3 includes a Wollaston prism 17, a hologram plate 18, a condenser lens 19, and a composite sensor unit 20. The Wollaston prism 17 is a birefringent polarizing element, and divides the laser beam L, which is reflected by the magneto-optical disc 16 and is linearly polarized, in Y-axis direction (i.e., direction Pa) (see FIG. 2) to three beams A1, B1 and C1 whose polarized directions are different from each other.

In the first embodiment, the laser beam L reflected by the magneto-optical disc 16 is divided into:

(a) a beam B1 which proceeds along the optical axis and is used for generating a servo signal; and (b) a pair of beams A1 and C1 which are divided from the laser beam L in the Y-axis direction that corresponds to the tangential direction Y' at the magneto-optical disc 16, and are used for generating a data signal.

The Wollaston prism 17 includes a first element 17A and a second element 17B. In order to obtain a predetermined intensity distribution between the divided beams, the first element 17A is arranged such that an optic axis thereof is rotated, with respect to the optical axis O, by +45 or −45 degrees to the Y-axis when seen from the beam incident side. The second element 17B is arranged such that an optic axis thereof is rotated, with respect to the optical axis O, by −71.5 or +71.5 degrees to the Y-axis. By cementing the first and second elements 17A and 17B, the Wollaston prism 17 is constituted. It should be noted that the directions of the optic axes of the elements 17A and 17B are not limited to the above-described angles. The angles should be determined in accordance with the intensity distribution of the divided beams.

The beam A1 is a polarized component, a polarized direction of which is a direction Pa which is similar to the polarization direction of the laser beam L. The beam C1 is a polarized component, a polarized direction of which is a direction Pb which is approximately perpendicular to the direction Pa. The beam B1 is a polarized component, which includes components polarized in directions Pa and Pb.

The hologram plate 18 is a phase type non-polarizing hologram element which does not have a polarizing property. Such a hologram element is formed as follows. On a wavefront of a beam reflected by an object or a wavefront of a beam passed through an object, a reference wavefront is overlapped to generate interference fringes, and then the interference fringes are recorded on a recording medium.

In such a hologram, a well-known defocusing wavefront (i.e., a wavefront of a spherical wave) or a tilting wavefront (i.e., a wavefront of an inclined plane wave) is recorded, individually or in a combined fashion, as infringe patterns.

Figure 3:
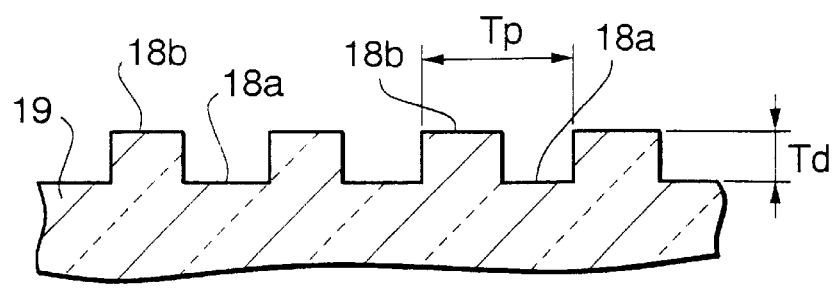
FIG. 3 is an enlarged cross sectional view of a hologram plate shown in FIGS. 1 and 2.
Figure 4:
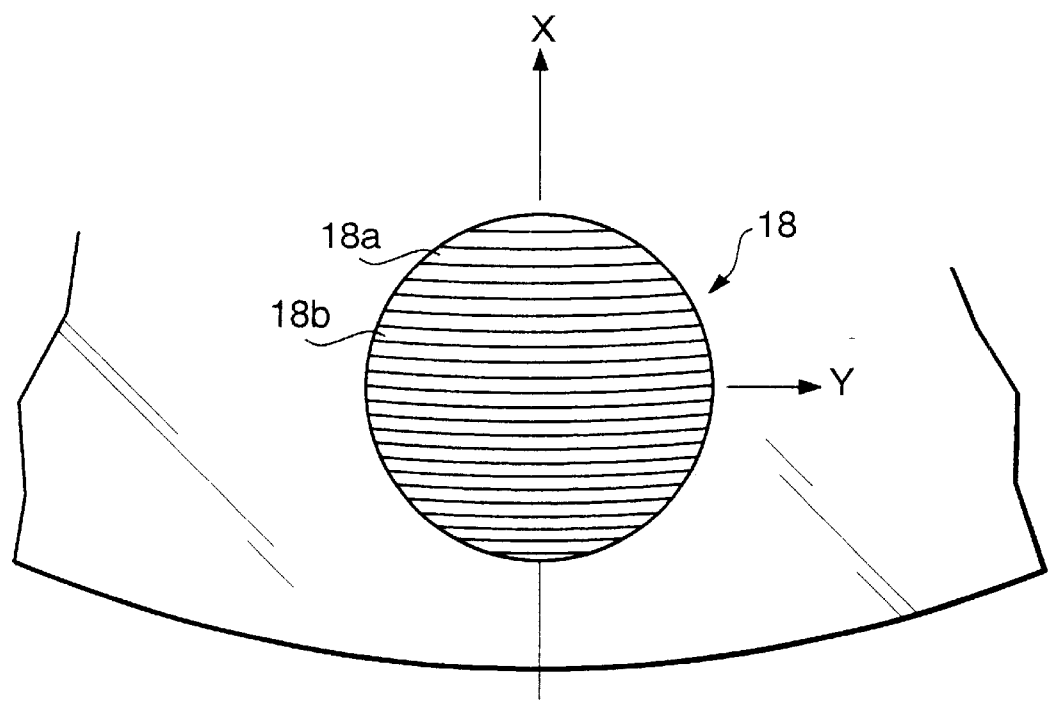
FIG. 4 is a plan view of the hologram plate shown in FIG. 3.

FIG. 3 shows a partial cross-sectional view of the hologram plate 18. The hologram plate 18 is formed by cutting out a part of a transparent base plate 19 so as to have a plurality of concave and convex portions 18a and 18b which are coaxial as shown in FIG. 4. Each cut-out portion has a rectangular cross section. In FIG. 3, Tp denotes a track pitch, and Td denotes a depth of the convex portions 18a.

As indicated in FIG. 4, the center of curvature of the coaxial concave and convex portions 18a and 18b is on the X-axis. In other words, the hologram pattern is a portion of a coaxial defocus pattern at a position shifted from the center of the coaxial circles along the X-axis. In the embodiment, a duty cycle of the concave portion 18a and the convex portion 18b is approximately 1:1. It should be noted that, the concave and convex portions 18a and 18b include a pattern of coaxial circles whose pitch is smaller at an outer portion of the pattern, and a pattern of straight lines, which have the same pitch Tp as the coaxial circular pattern, in the Y-axis direction. Thus, the hologram plate divides an incident beam along the X-axis, and even gives positive/negative defocus to the divided beams.

Each element of the optical head is arranged so that, when the laser beam is converged on the data recording surface of the magneto-optical disc 16 appropriately, beam spots formed by the pair of beams, which are generated by dividing the reflected beam by the hologram plate 18, have substantially the same size and same circular shape. If the distance between the optical head and the magneto-optical disc 16 changes and the focusing condition changes, the shape of the beam spots formed on the pair of servo sensors changes. Then, the outputs of the servo sensors change. By applying a predetermined signal processing, the focus servo signal and the tracking servo signal are obtained.

It should be noted that by changing the depth Td as shown in FIG. 3, a balance between the intensity of the pair of beams can be adjusted.

As described above, each of the protrusions and grooves formed on the hologram plate 18 has a rectangular cross section in the above-described embodiment. However, the present invention is not limited to use such a hologram plate. The cross section of each of the protrusions and grooves may be formed to have various shape such as a sinusoidal shape, a stepped shape, a saw-tooth shape, or the like.

Figure 5:
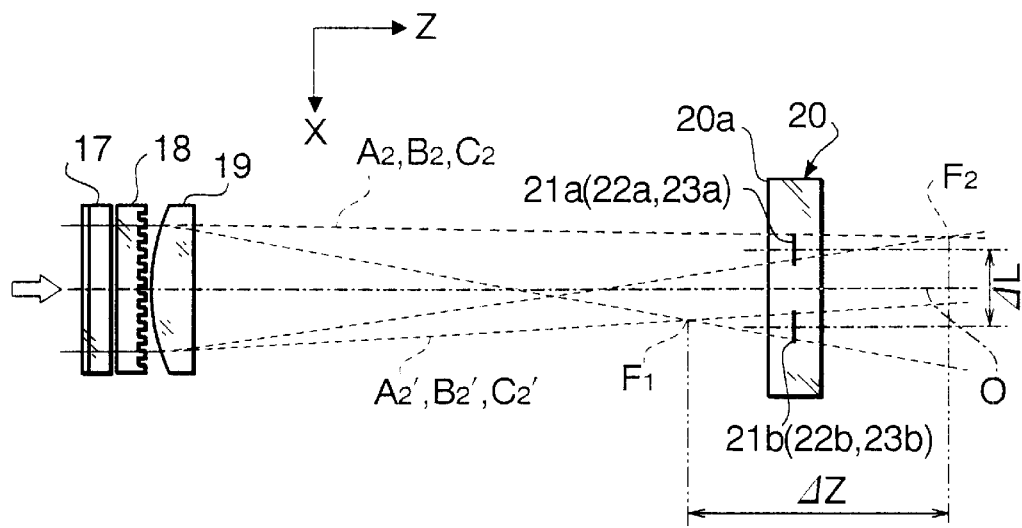
FIG. 5 is a side view of a signal detection unit shown in FIG. 2.

By the hologram plate 18, the beams A1, B1 and C1, which are divided by the Wollaston prism 17, are further divided into first divided beams A2, B2 and C2, and second divided beams A2', B2' and C2', respectively, and further, a defocus along the optical axis O is given. In this embodiment, the first beams A2, B2 and C2 are −1st order diffraction components and A2', B2' and C2' are +1st order diffraction components. Specifically, as shown in FIG. 5, each of the first beams A2, B2 and C2 converges at position F2 which is located behind the sensors 21a, 22a and 23a, and each of the second beams A2', B2' and C2' converges at position F1 which is located on the hologram plate side of the sensors 21b, 22b and 23b. It should be noted that, the optical axis O is defined as a normal line passing the center of the signal detection unit 3. For the following description, a distance, along the optical axis O, between the first position F1 and the second position F2 is represented by ΔZ.

As described above, by the Wollaston prism 17 and the hologram plate 18, the light beam L is divided into six beams A2, B2, C2, A2', B2' and C2' The beams A2, A2', C2 and C2' are received by the light receiving elements for generating a recording signal (MO signal) and a pre-format signal (RO signal) which are used for data signals. The beams B2 and B2' are received by the light receiving elements for generating a focusing error signal (FES) and a tracking error signal (TES) which are used as servo signals.

For the following description, the distance between the centers of the light receiving elements 22a and 22b for generating the servo signals is represented by ΔL.

Since each of the beams A2, A2', B2, B2', C2 and C2' is given a defocus, beam spots formed by the beams A2, B2 and C2 have substantially the same diameters, beam spots formed by the beams A2', B2' and C2' have substantially the same diameters, but the diameters of the beam spots formed by the beams A2, B2 and C2 and the diameters of the beams spots formed by the beams A2', B2' and C2' are different.

Figure 2:
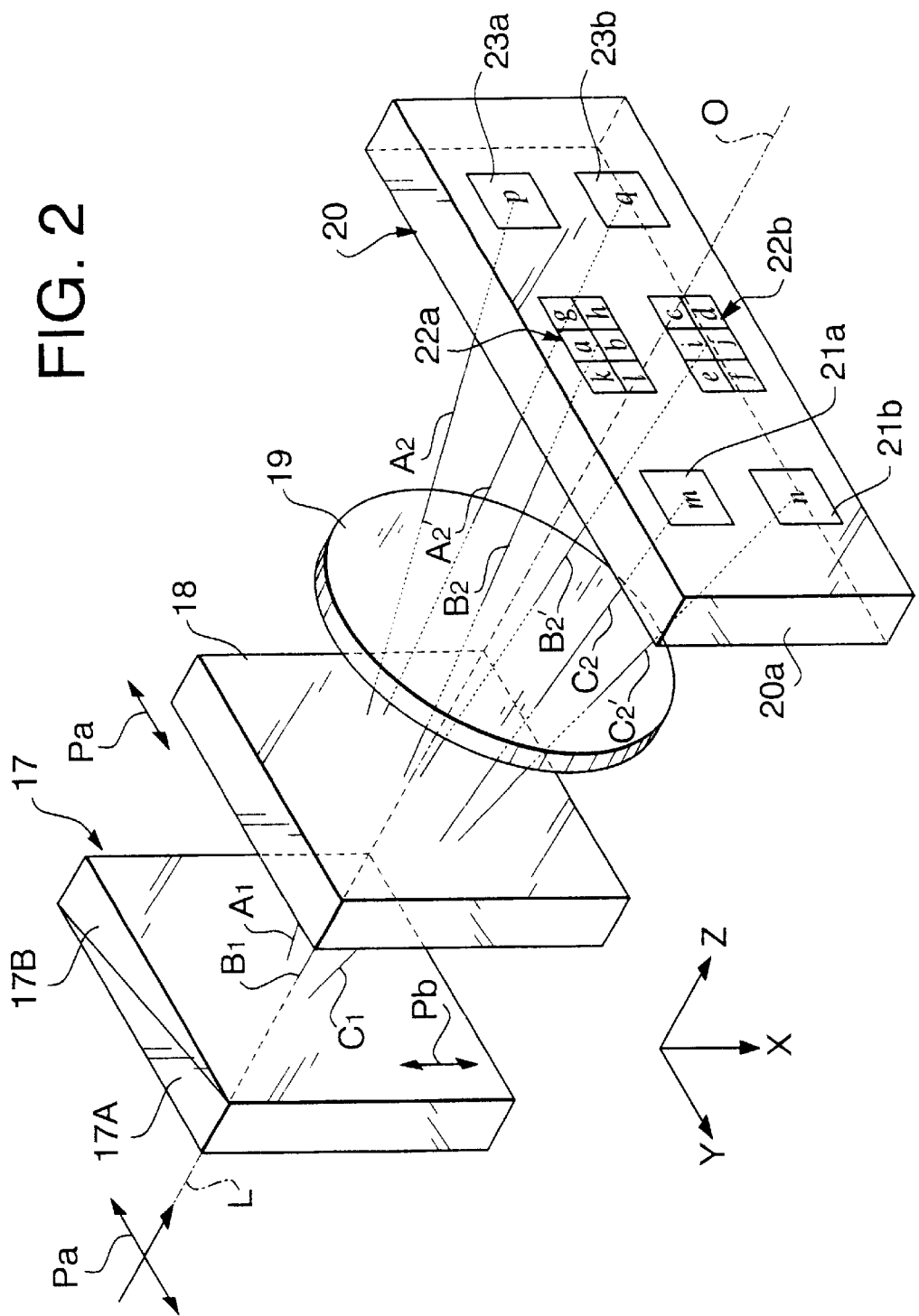
FIG. 2 is a perspective view of an enlarged view of a signal detection unit of the optical head shown in FIG. 1.
Figure 6:
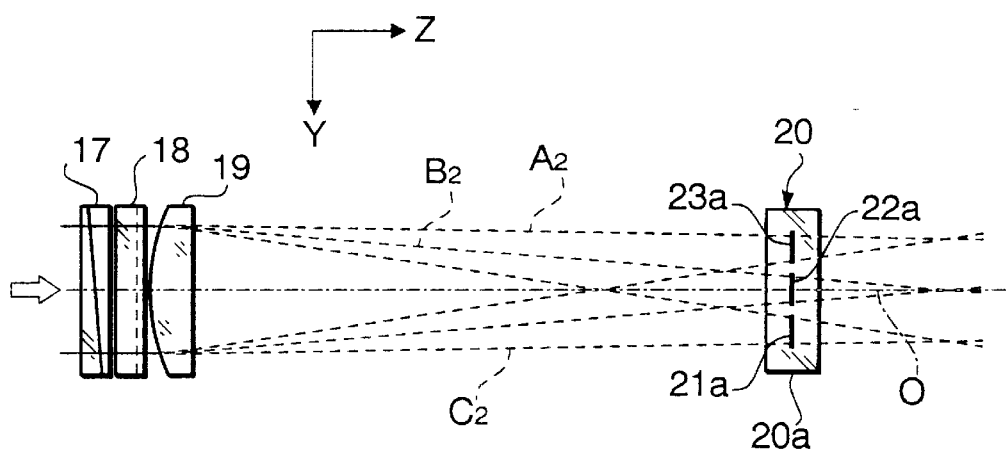
FIG. 6 is a top view of the signal detection unit shown in FIG. 2.

The composite sensors 20 has light receiving elements 21a, 21b, 23a and 23b for generating the data signals, and the light receiving elements 22a and 22b for generating the servo signal. The sensors 21a, 21b, 22a, 22b, 23a and 23b are arranged on the same plane perpendicular to the central axis of the beam L, and accommodated in a package 20a as shown in FIGS. 2, 5 and 6.

Figure 7:
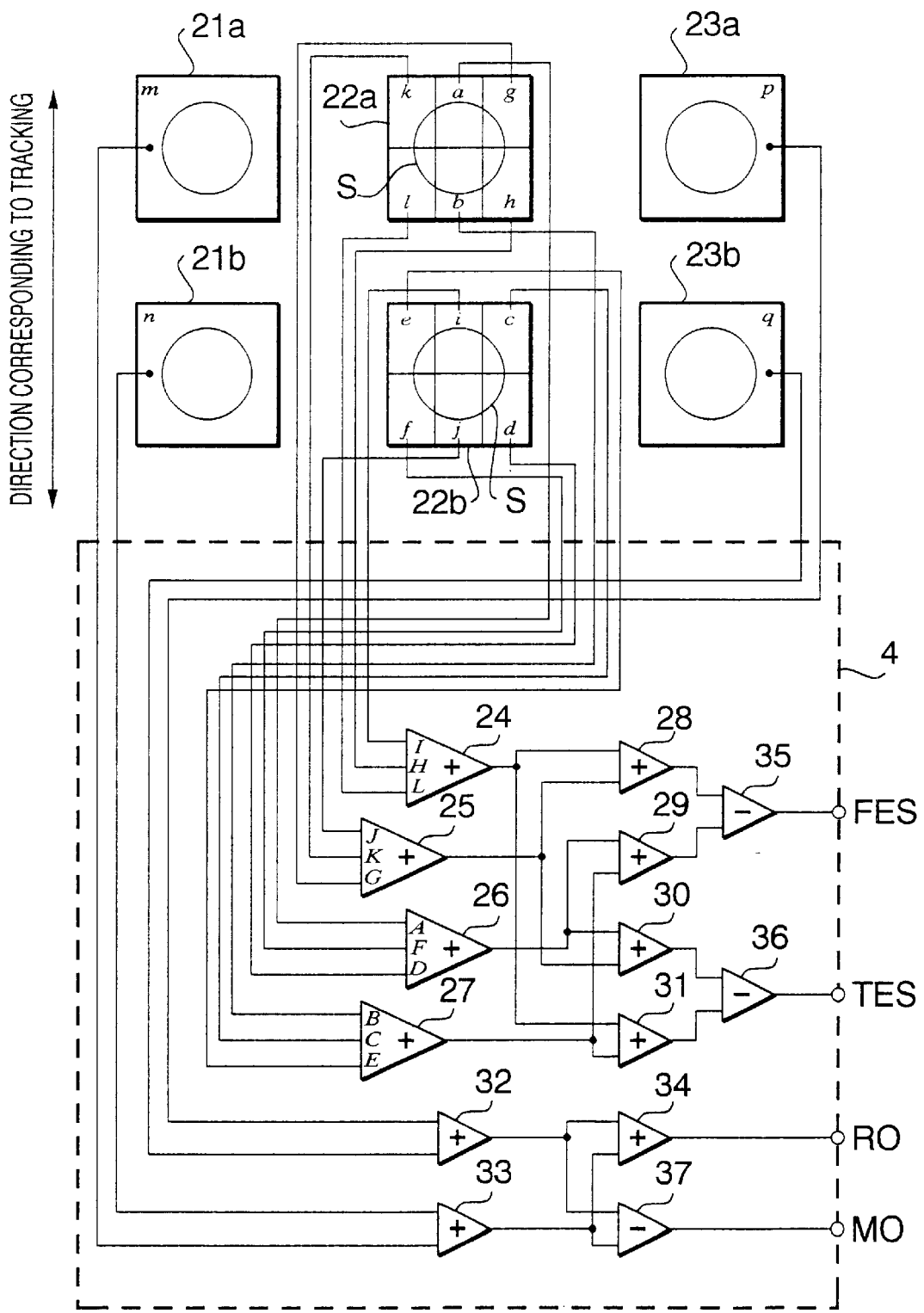
FIG. 7 shows a connection between light receiving elements and a signal processing unit.

The sensors 21a and 21b, the sensors 22a and 22b, and the sensors 23a and 23b are paired, respectively. As shown in FIG. 7, the light receiving surface of each of the servo sensors 21a and 21b is divided into six (2×3) areas by a line extending in a direction perpendicular to the X-axis direction (i.e., a direction corresponding to the tracking direction), and by two lines extending in the X-axis direction. These divided areas will be referred to as light receiving elements.

In the following description, labels k, a, g, l, b and h are assigned to the areas of the servo sensor 22a from left to right, and from an upper row to a lower row, and labels e, i, c, f, j and d are assigned to the areas of the servo sensor 22b from left to right, and from an upper row to a lower row. Further, labels m, n, p and q are assigned to the light receiving surfaces of the data sensors 21a, 21b, 23a and 23b, respectively. For the sake of simplicity, the output signals of the light receiving surfaces a–n, p and q are indicated by upper cases of the surfaces, i.e., indicated as signals A–N, P and Q, respectively.

The outputs A–N, P and Q are input to the signal processing unit 4, where the focusing error signal (FES) and the tracking error signal (TES) are generated. In the optical head according to the first embodiment, the focus error signal (FES) is generated in accordance with a spot size method, and the tracking error signal is generated in accordance with a push-pull method. Since the above methods are well known, the description thereof, in particular a principal thereof, will not be provided in this specification.

The signal processing unit 4 is provided with a first to eleventh adders 24 through 34, and a first to third subtractors 35 through 37.

The first adder 24 sums the outputs I, H and L, and the second adder 25 sums the outputs J, K and G. The third adder 26 sums the outputs A, F and D, and the fourth adder 27 sums the outputs B, C and E.

The fifth adder 28 sums the output of the first adder 24 (i.e., I+H+L) and the output of the second adder 25 (i.e., J+K+G). The output of the fifth adder 28 (i.e., I+H+L+J+K+G) is input to one of input terminals of the first subtractor 35. The sixth adder 29 sums the output of the third adder 26 (i.e., A+F+D) and the output of the fourth adder 27 (i.e., B+C+E). The output of the fifth adder 28 (i.e., A+F+D+B+C+E) is input to the other of input terminals of the first subtractor 35. The first subtractor 35 outputs a difference between the outputs of the fifth adder 28 and the sixth adder 29. The output of the first subtractor 35 is the focusing error signal (FES).

The seventh adder 30 sums the output of the second adder 25 (i.e., J+K+G) and the output of the third adder 26 (i.e., A+F+D). The output of the seventh adder 30 (i.e., J+K+G+ A+F+D) is input to one of input terminals of the second subtractor 36. The eighth adder 31 sums the output of the first adder 24 (i.e., I+H+L) and the output of the fourth adder 27 (i.e., B+C+E). The output of the eighth adder 31 (i.e., I+H+L+B+C+E) is input to the other of input terminals of the second subtractor 36. The second subtractor 36 outputs a difference between the outputs of the seventh adder 30 and the eighth adder 31. The output of the second subtractor 36 is the tracking error signal (TES).

The ninth adder 32 sums the outputs of the data sensors 23a and 23b (i.e., P+Q), and the tenth adder 33 sums the outputs of the data sensors 21a and 21b (i.e., M+N). The eleventh adder 34 sums the outputs of the ninth adder 32 and the tenth adder 33. The output of the eleventh adder 34 (i.e., P+Q+M+N) is the pre-format signal (RO signal).

The third subtractor 37 outputs the different between the outputs of the ninth adder 32 (i.e., P+Q) and the tenth adder 33 (i.e., M+N). The outputs of the third subtractor 37 is the data signal (MO signal).

Figure 8:
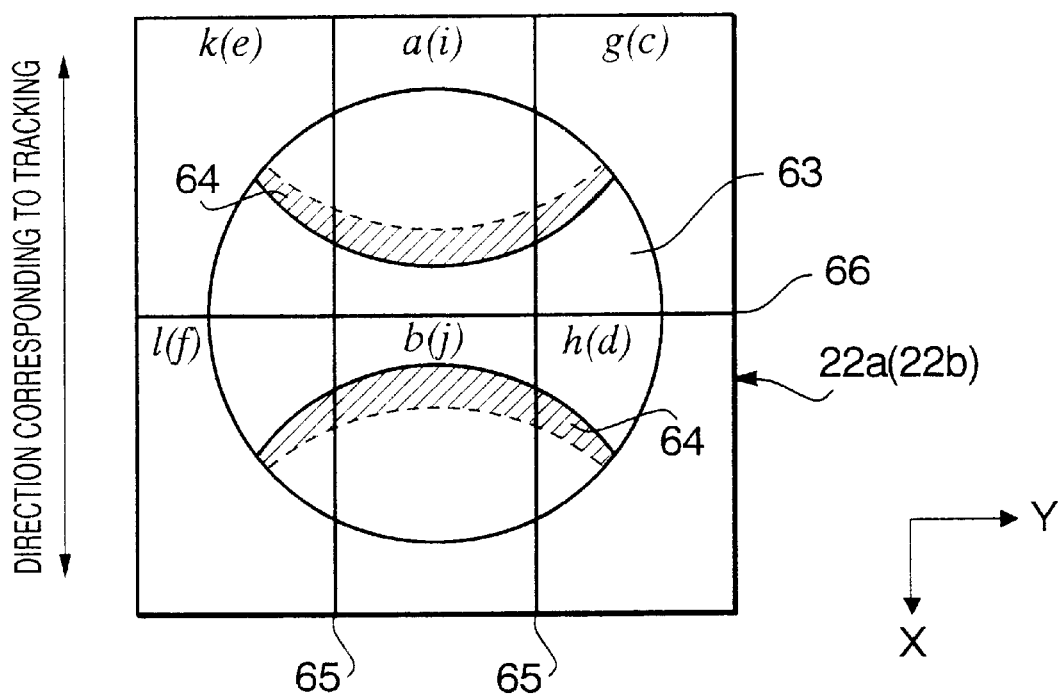
FIG. 8 illustrates beam spots formed by zero order component and ±1st order components on light receiving elements for obtaining a servo signal.

As described above, according to the first embodiment, as shown in FIG. 8, the sensors 22a and 22b are arranged such that dividing lines 65 which are related to generation of the focusing error signal (FES) extend in the X-axis direction, and the signal processing unit 4 generates the focusing error signal based on the outputs of the areas divided by the dividing lines 65, in accordance with the spot size method. Therefore, even if the distance between the beam spots formed by the ±1st order diffraction components 64 formed on the servo sensor 22a (22b) varies when the optical discs having different track pitches are to be read, each beam spot is divided into three sections by lines 65 which extend in the direction corresponding to the tracking (i.e., in the X-axis direction), a ratio of the light amount received by the inside areas a and b (i and j) to the light amount received by the outside areas k, g, l and h (e, c, f and d) changes a little in comparison with the conventional sensors. Thus, variation of the distance between the beam spots on the servo sensors may affect little in generating the focusing error signal (FES). Therefore, the T/F cross talk due to the difference of the track pitch can be reduced effectively.

In FIG. 8, two positions of the beam spots 64 are indicated respectively by solid lines, and broken lines. The solid lines represent the positions of the beam spots when the track pitch is relatively wide, while the broken lines represent the positions of the beam spots when the track pitch is relatively narrow. The hatch lines show the variation of the area of the beam spots. Even if the distance between the beam spots 64 is changed, change of the area in each of the light receiving areas is relatively small in comparison with the conventional sensors.

The tracking error signal (TES) is generated by dividing the light receiving surface of the servo sensors 22a and 22b by a line 66 which extends in a direction perpendicular to the direction corresponding to the tracking (i.e., in a direction perpendicular to the X-axis direction: in Y-axis direction), and in accordance with the push-pull method.

Due to the above-described divisions, the light receiving surface of each of the servo sensors 22a and 22b is divided into six areas, which is greater than the number of areas in the conventional sensors. However, by an appropriate connection as described above, the signal processing unit 4 has the same circuitry as the conventional one. Therefore, although the sensors 22a and 22b are different from the conventional sensors, it is not necessary to have a specific IC for processing the signals output by these sensors 22a and 22b. Therefore, the manufacturing cost may not increase so much even if the particular sensor 22a and 22b are employed, and accurate focusing error signal (FES) and tracking error signal (TES) can be obtained.

Further, a direction where the reflected laser beam L is divided into three beams is perpendicular to a direction corresponding to the tracking direction, a direction where each beam is further divided into two beams by the hologram plate 18 is parallel with a direction corresponding to the tracking direction, and each beam proceeds in a direction perpendicular to the magneto-optical disc 16, the thickness of the optical head, and therefore the thickness of the disc drive employing such an optical head can be reduced.

In the above-described first embodiment, it is preferable that following condition (1) is satisfied.

$$\alpha \leq \Delta L \leq 3\alpha \tag{1}$$

where, $\Delta L$ represent a distance between the centers of the servo sensors 22a and 22b (see FIG. 5), and $\alpha$ is expressed by equation (2).

$$\alpha = 2 \cdot [4 \cdot (NA_0)^2 \cdot \sigma + 3 \cdot (NA_1)^2 \cdot \Delta Z] + NA_1 \tag{2}$$

where:
  $NA_0$ represents a numerical aperture of the objective lens 15 of the optical head;
  $NA_1$ represents a numerical aperture of the condenser lens 19 of the optical head;
  $\sigma$ represents a deviation amount of the surface of the magneto-optical disc 16 when rotating; and
  $\Delta Z$ represents a distance, along the optical axis O, between the converged positions of the divided beams B2 and B2'.

In condition (1), if $\Delta L$ is smaller than the lower limit $\alpha$, the distance between the sensors 22a and 22b is too small. In such a case, part of a beam spot to be received by one of the sensors 22a and 22b may be received by the other sensor. In such a case, the desired capture range of focusing error signal cannot be obtained, and the focus servo may be disabled.

If $\Delta L$ is greater than the upper limit $3\alpha$, if deviation of the distance between the beam spots due to deviation of the wavelength is too large, and the deviation may not be ignored. That is, if the distance between the sensors 22a and 22b are too great (i.e., $\Delta L \geq 3\alpha$), the diffraction angle of the hologram should be made greater. In such a case, if the wavelength of the laser beam emitted by the laser diode 5 varies, the distance between the beam spots changes greatly and the sensitivity of the focusing condition is greatly changed. Therefore, in such a case, the focusing servo characteristics is deteriorated.

A numerical example of the first embodiment may have a configuration such that $NA_0=0.55$, $NA_1=0.061$, $\sigma=10$ μm, $\Delta Z=1.63$ mm. In this case, $\alpha=0.994\approx1$ [mm]. In this case, it is preferable that the distance $\Delta L$ between the sensors 22a and 22b should be more than 1 mm, and less than 3 mm.

Figure 9:
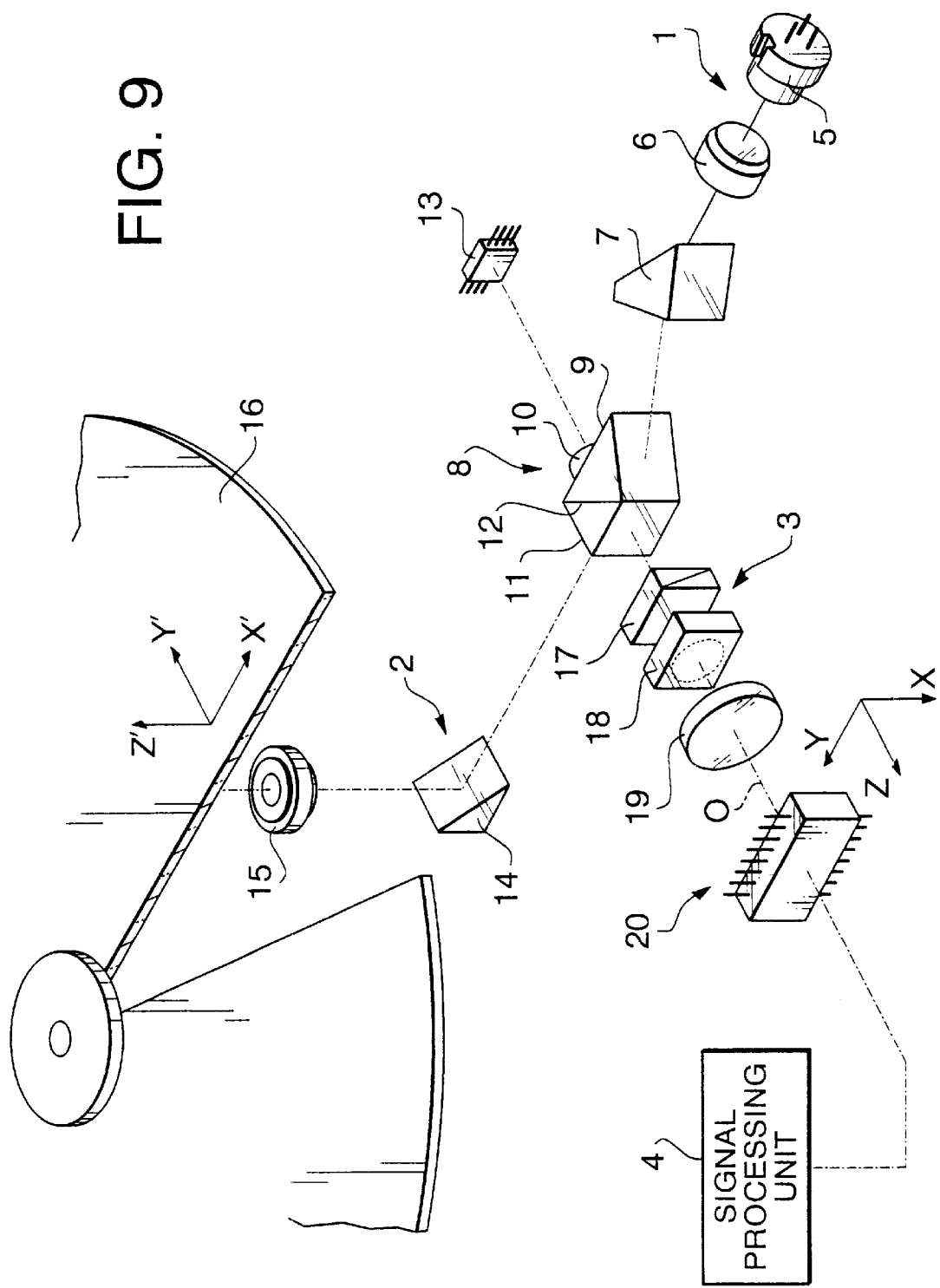
FIG. 9 is a perspective view of a signal detection unit according to a second embodiment.

FIGS. 9 and 10 show an optical head according to the second embodiment.

As shown in FIGS. 9 and 10, in the second embodiment, a direction in which the Wollaston prism 17 divides a beam is parallel to a direction (X-axis direction) corresponding to the tracking direction, and the hologram plate 18 divides a beam in a direction (Y-axis direction) perpendicular to a direction corresponding to the tracking direction. Three pairs of sensors 21a and 21b, 22a and 22b, 23a and 23b are arranged such that each pair of sensors are arranged in the Y-axis direction, and the three pairs are arranged in the X-axis direction.

FIG. 11 shows a partial cross-sectional view of the hologram plate 18 according to the second embodiment. Similar to the first embodiment, the hologram plate 18 is formed by cutting out a part of a transparent base plate 19 so as to have a plurality of concave and convex portions 18*a* and 18*b* which are coaxial as shown in FIG. 12. Each cut-out portion has a rectangular cross section.

As indicated in FIG. 12, the center of curvature of the coaxial concave and convex portions 18*a* and 18*b* is on the Y-axis. In other words, the hologram pattern is a portion of a coaxial defocus pattern at a position shifted from the center of the coaxial circles along the Y-axis. In the embodiment, a duty cycle of the concave portion 18*a* and the convex portion 18*b* is approximately 1:1. It should be noted that, the concave and convex portions 18*a* and 18*b* include a pattern of coaxial circles whose pitch is smaller at an outer portion of the pattern, and a pattern of straight lines, which have the same pitch as the coaxial circular pattern, in the X-axis direction. Thus, the hologram plate divides an incident beam along the Y-axis, and even gives positive/negative defocus to the divided beams.

FIG. 13 shows connection between the sensors 21*a*, 21*b*, 22*a*, 22*b*, 23*a* and 23*b* and the signal processing unit 4 according to the second embodiment. The second embodiment is different from the first embodiment only in the arrangement of the optical system and the sensors, and the signal processing is the same as in the first embodiment. Accordingly, the elements similar to those in the first embodiment are given the same reference numerals, and the description thereof will be omitted.

In the second embodiment, the structure of the optical system is substantially similar to that disclosed in the Japanese Patent Provisional Publication No. HEI 7-326084. Therefore, the connections between the servo sensors and the signal processing unit 4 are adjusted, substantially the same configuration of the optical system disclosed in the publication HEI 7-326084 can be adopted.

As described above, according to the invention, the light receiving areas of the servo sensor is divided, for generating the focusing error signal, by two lines which extend in a direction parallel to a direction corresponding to the tracking direction. The light receiving areas is divided, for generating the tracking error signal, by a line which extends in a direction perpendicular to a direction corresponding to the tracking direction, even a disc whose tracking pitch is different from a designed pitch, the T/F cross talk can be suppressed effectively, and stable servo signals can be obtained.

In the second embodiment, if the wavelength of the laser beam changes, a distance between the beam spots S in FIG. 11 changes, and therefore, the focusing signal (FES) includes errors.

FIG. 14 shows a graph indicating a focusing error sensitivity which is defined as a relationship between a defocus amount and the amplitude of the focusing error signal (FES). The graph indicates values when the diameter of a spot is approximately 200 $\mu$m, and a width of the central area of the divided areas of the sensor (i.e., a length of a shorter side of the area a, b, i or j) is approximately ⅓ of the diameter of the spot S. As shown in FIG. 12, when the deviation of the distance between the spots S is within a range of 0 [$\mu$m] through 20 [$\mu$m], the relationship between the defocus amount and the amplitude of the focusing error signal is substantially constant. When the deviation of the distance between the beam spots S is greater than 50 [$\mu$m], the amplitude of the focusing error signal for a defocus amount is smaller than the case where the deviation of the distance between the spots S is within a range of 0 [$\mu$m] through 20 [$\mu$m]. In other words, when the wavelength of the laser beam changes and the distance between the spots S on the light receiving elements 22*a* and 22*b* changes, the focusing operation that is executed in accordance with the focusing error signal (FES) is insufficient, and the defocus cannot be removed completely.

Further, as shown in FIG. 14, when the deviation of the distance between the spots S reaches 100 [$\mu$m], the amplitude of the focusing error signal is approximately zero, and the defocus cannot be detected based on the focusing error signal (FES).

In a third embodiment, the focusing error signal (FES) is compensated in accordance with the change of the distance between the beam spots S.

FIG. 15 shows a compensation circuit for compensating the focusing error signal (FES). It should be noted that the circuitry shown in FIG. 14 is to be inserted between the output terminal of the subtractor 35 and the FES output terminal of the signal processing unit 4 in FIG. 13.

The compensation circuit includes adders 38 through 41, subtractors 42 and 43, and an adder 44. The adder 38 sums the outputs K and L, the adder 39 sums the outputs G and H, the adder 40 sums the outputs C and D, and the adder 41 sums the outputs E and F. The subtractor 42 subtracts the output of the adder 39 from the output of the adder 38, i.e., (K+L)−(G+H), the subtractor 43 subtracts the output of the adder 41 from the output of the adder 40, i.e., (C+D)−(E+F). The adder 44 sums the outputs of the subtractors 42 and 43, i.e., [(K+L)−(G+H)]+[(C+D)−(E+F)]. The output β of the adder 44 represents the deviation of the distance between the beam spots S.

As shown in FIG. 15, the compensation circuit further includes an amplifier 45 whose gain is expressed as G(β), i.e., the gain of the amplifier 45 is a function of the output β of the adder 44. The function G(β) is defined such that the lowering of the sensitivity due to increase of the distance between the spots S is compensated. The focusing error signal (FES) is input to the amplifier 45, and the compensated focusing error signal (CFES) is output therefrom. The compensated focusing error signal (CFES) has a substantially constant characteristic regardless of the deviation of the distance between the beam spots S.

It should be noted that, the characteristics shown in FIG. 14 is only an example, and actual characteristic and therefore the function G(β) should be determined in accordance with individual optical head.

It should be noted that, in the above description, the third embodiment is described as a modification of the second embodiment, i.e., the focusing error signal output by the second embodiment is compensated. However, the focusing error signal output by the first embodiment can also be compensated using in the similar manner.

The present disclosure relates to the subject matters contained in Japanese Patent Applications No. HEI 11-012620 and No. HEI 11-012621, both filed on Jan. 21, 1999, which are expressly incorporated herein by reference in their entireties.

What is claimed is:

1. An optical head, comprising:
    a beam splitting element which divides a beam reflected by a data recording surface of an optical disc into two beams and generates opposite defocus therebetween;
    a pair of light receiving elements which receive said two beams divided by said beam splitting element, respectively, said pair of light receiving elements being arranged substantially on a same plane, a light receiving surface of each of said pair of light receiving elements being divided, by two lines extending in a direction corresponding to a tracking direction on the optical disc, into at least three light receiving areas, a focusing error signal being generated in accordance with outputs of said at least three light receiving areas.

2. An optical head, comprising:

a beam splitting element which divides a beam reflected by a data recording surface of an optical disc into two beams and generates opposite defocus therebetween;

a pair of light receiving elements which receive said two beams divided by said beam splitting element, respectively, said pair of light receiving elements being arranged substantially on a same plane, a light receiving surface of each of said pair of light receiving elements being divided, by two lines extending in a direction corresponding to a tracking direction on the optical disc, into at least three light receiving areas, a focusing error signal being generated in accordance with outputs of said at least three light receiving areas, the light receiving surface of each of said pair of light receiving elements being divided, by another line extending in a direction that is perpendicular to a direction corresponding to a tracking direction on the optical disc, into two light receiving areas, a tracking error signal being generated in accordance with outputs of said two light receiving areas.

3. The optical head according to claim 2, wherein the focusing error signal is generated in accordance with a spot size method, and the tracking error signal is generated in accordance with a push-pull method.

4. The optical head according to claim 2, wherein said beam splitting element comprises a hologram element.

5. The optical head according to claim 4, wherein the pair of beams divided by said beam splitting element are ±1st order diffraction beams diffracted by said hologram element, wherein $\Delta L$ is a distance between the centers of the light receiving elements satisfies the following relationship:

$$\alpha \leq \Delta L \leq 3\alpha$$

where, $\alpha$ is expressed by:

$$\alpha = 2 \cdot [4 \cdot (NA_0)^2 \cdot \sigma + 3 \cdot (NA_1)^2 \cdot \Delta Z] + NA_1$$

where, $NA_0$ is a numerical aperture of an objective lens of said optical head, $NA_1$ is a numerical aperture of a servo lens of said optical head, $\sigma$ is a deviation amount of a surface of the optical disc, and $\Delta Z$ a distance, along an optical axis of said optical head, between converging positions of said divided beams.

6. An optical head, comprising:

a beam splitting element which divides a beam reflected by a data recording surface of an optical disc into two beams and generates opposite defocus therebetween; and a pair of light receiving elements which receive said two beams divided by said beam splitting element, respectively, a light receiving surface of each of said pair of light receiving elements being divided, by at least two lines extending in a direction corresponding to a tracking direction on the optical disc, into at least three light receiving areas, at least a focusing error signal being detected based on outputs of said pair of light receiving elements, the focusing error signal being compensated for wavelength changes by a compensation signal generated in accordance with outputs from said at least three light receiving areas.

7. The optical head according to claim 6, further comprising a compensation system which compensates the focusing error signal based on the deviation of the wavelength of the beam.

8. The optical head according to claim 7, said compensation system comprising an amplifier whose gain is changeable in accordance with the deviation of the wavelength of the beam.

9. The optical head according to claim 6, wherein said pair of light receiving elements are arranged substantially on a same plane.

10. The optical head according to claim 9, wherein a light receiving surface of each of said pair of light receiving elements is divided, by two lines extending in a direction corresponding to a tracking direction on the optical disc, into at least three light receiving areas.

11. The optical head according to claim 6, said compensation signal being generated based on the outputs of two side areas of the three divided areas.

12. An optical head, comprising:

a beam splitting element which divides a beam reflected by a data recording surface of an optical disc into two beams and generates opposite defocus therebetween;

a pair of light receiving elements which receive said two beams divided by said beam splitting element, respectively, a light receiving surface of each of said pair of light receiving elements being divided, by two lines extending in a direction corresponding to a tracking direction on the optical disc and by another line extending in a direction that is perpendicular to a direction corresponding to a tracking direction on the optical disc, into six light receiving areas, and a focusing error signal being generated in accordance with outputs of said six light receiving areas and signal compensating the focusing error signal being generated in accordance with the output of two side areas of the six light receiving areas.

13. The optical head according to claim 12, wherein said pair of light receiving elements are arranged substantially on a same plane.

* * * * *